United States Patent
Rash et al.

(10) Patent No.: US 9,141,723 B2
(45) Date of Patent: Sep. 22, 2015

(54) CACHING SLIDING WINDOW DATA

(71) Applicant: Facebook, Inc., Menlo Park, CA (US)

(72) Inventors: Samuel Rash, Fremont, CA (US); Timothy Williamson, Palo Alto, CA (US); Martin Traverso, Menlo Park, CA (US)

(73) Assignee: Facebook, Inc., Menlo Park, CA (US)

( * ) Notice: Subject to any disclaimer, the term of this patent is extended or adjusted under 35 U.S.C. 154(b) by 316 days.

(21) Appl. No.: 13/831,421

(22) Filed: Mar. 14, 2013

(65) Prior Publication Data
US 2014/0280126 A1    Sep. 18, 2014

(51) Int. Cl.
G06F 17/30    (2006.01)
G06Q 10/10    (2012.01)
G06Q 30/02    (2012.01)
H04L 29/08    (2006.01)

(52) U.S. Cl.
CPC .... G06F 17/30902 (2013.01); G06F 17/30011 (2013.01); G06F 17/30864 (2013.01); G06F 17/30867 (2013.01); G06Q 10/10 (2013.01); G06Q 30/02 (2013.01); H04L 67/00 (2013.01)

(58) Field of Classification Search
CPC .............. G06F 17/30902; G06F 17/30864; G06F 17/30867; G06F 17/30011; G06Q 10/10; G06Q 30/02
USPC .......................... 707/736, 737, 738, 739, 740
See application file for complete search history.

(56) References Cited

U.S. PATENT DOCUMENTS

| | | | | |
|---|---|---|---|---|
| 7,162,698 | B2 * | 1/2007 | Huntington et al. | 715/736 |
| 8,326,836 | B1 * | 12/2012 | Pike et al. | 707/739 |
| 8,874,575 | B2 * | 10/2014 | Mallinson | 707/736 |
| 2002/0146015 | A1 * | 10/2002 | Bryan et al. | 370/401 |
| 2003/0182310 | A1 * | 9/2003 | Charnock et al. | 707/104.1 |
| 2007/0288635 | A1 * | 12/2007 | Gu et al. | 709/226 |
| 2008/0167837 | A1 * | 7/2008 | Basak et al. | 702/179 |
| 2009/0182779 | A1 * | 7/2009 | Johnson | 707/200 |
| 2010/0138919 | A1 * | 6/2010 | Peng et al. | 726/22 |
| 2011/0078141 | A1 * | 3/2011 | Fakeih | 707/736 |
| 2011/0153603 | A1 * | 6/2011 | Adiba et al. | 707/737 |
| 2011/0218999 | A1 * | 9/2011 | Kan et al. | 707/737 |

* cited by examiner

*Primary Examiner* — Shahid Alam
*Assistant Examiner* — Andrew N Ho
(74) *Attorney, Agent, or Firm* — Perkins Coie LLP

(57) ABSTRACT

Disclosed are methods, systems, paradigms and structures for caching data associated with a sliding window in computer systems. A sliding window can include a time window that progresses with time, and the data can include time series data. As time progresses, the sliding window changes bringing in new data. The cache is updated with new data as and when the sliding window moves. The sliding window data is cached at various granularity levels. The method includes storing a first portion of the data at a first granularity level and a second portion at a second granularity level. The data is cached at various granularity levels in order to effectively use the cache considering at least cache updating criteria such as (i) number of times a storage unit is queried to retrieve the data for updating the cache, (ii) the day/date/time at which the storage unit is queried.

20 Claims, 9 Drawing Sheets

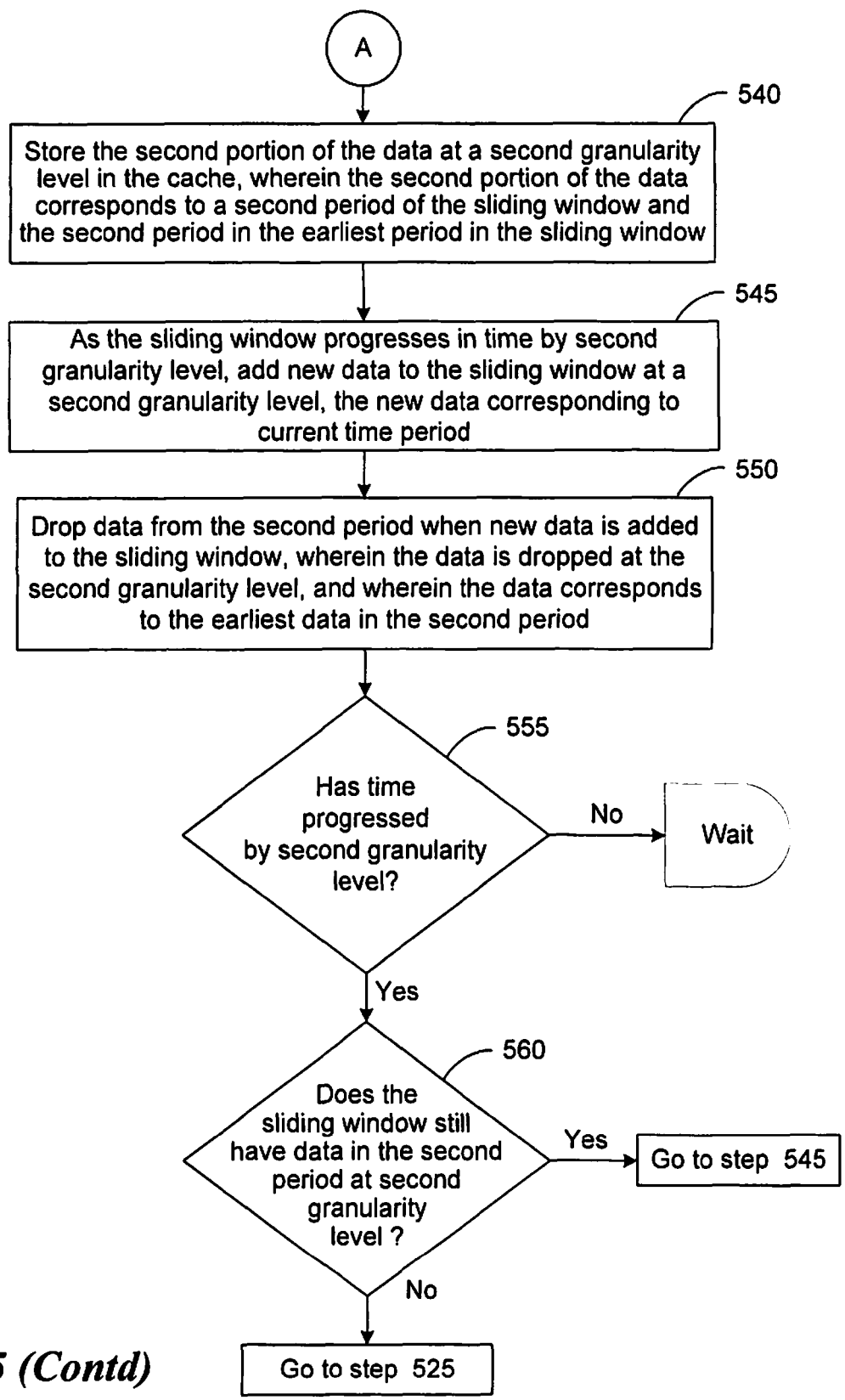
FIG. 5 (Contd)

CACHING SLIDING WINDOW DATA

FIELD OF INVENTION

This invention generally relates to caching data in computer related technologies. More specifically, the invention relates to caching data that is associated with a sliding window.

BACKGROUND

In computer related technologies, certain applications such as reports are generated to obtain information on various aspects. For example, in a social networking environment reports may be generated for obtaining data associated with a sliding window. The data can include information such as the list of users who visited a particular website in the last seven days, number of comments made by users in the last hour, etc. As time progresses, the sliding window moves and new data is generated. Obtaining results from the database every time the sliding window moves or every time the report is generated consumes significant computing resources and causes a significant delay.

Some caching techniques have been suggested to cache frequently retrieved sliding window data. The prior caching techniques are not efficient in terms of managing the cache with respect to sliding window data. For example, the prior caching techniques are not efficient at least in (a) determining the buffer sizes to be allotted to cache the data, (b) determining how much old data has to be purged from the cache as new data is added when the sliding window moves, (c) minimizing the number of database calls to obtain the data for updating the cache, etc.

The prior caching techniques either made use of a large cache to hold higher resolution sliding window data, such as 168 data elements for a week at hourly granularity level, or a smaller cache to hold data at lower resolution, such as 7 data elements for a week at daily granularity level, or even smaller cache that holds data such as 24 data elements for a day at hourly granularity level. That is, the prior caching techniques emphasized on cache size or granularity level or storage unit access frequency. The prior caching techniques lacked ability to store data at higher granularity while consuming less memory or accessed the storage unit more frequently.

SUMMARY

Introduced here are methods, systems, paradigms and structures for caching data associated with a sliding window in computer systems. Certain methods include caching data that is associated with a sliding window and that is frequently requested by an application/end user. One possible sliding window can include a time window that progresses with time. The data associated with a time window can include time series data, such as users or number of users who have visited a particular website in the last one week from current date and time. The time series data is cached to serve queries that may request such time series data often. As time progresses, the sliding window changes bringing in new data. The cache is updated with new data as and when the sliding window moves.

The method includes caching data associated with the sliding window at various granularity levels. In one embodiment, the method includes storing a first portion of the data at a first granularity level and a second portion of the data at a second granularity level wherein the first granularity level is different from the second granularity level. The data is cached at various granularity levels in order to effectively use the cache considering (i) the amount of data to be stored, that is, a size/period of the sliding window, (ii) a size of the cache, (iii) the granularity level at which the data is often requested by the end users/applications, (iv) cache update criteria such as—(a) a number of times data is obtained from a storage unit to update the cache, (b) the day/date/time, etc. at which the cache is updated with the data from the storage unit, etc. Typically, data is stored in higher granularity level to obtain a higher resolution sliding window (but memory consumption is higher) and stored at lower granularity level to minimize memory consumption. In at least some embodiments of the disclosed technique, the method facilitates storing data at higher granularity level while consuming less memory.

The second portion of the data corresponds to the earliest period of the sliding window. The first portion corresponds to period later than the earliest period and earlier than the current period. The first portion of the data can be aggregated data, that is, data at second granularity level aggregated to first granularity level, for example, to save space in the cache. When the sliding window progresses, new data is added to the cache at the current time period in second granularity level, and in order to compensate for the cache space occupied by the new data, old data associated with the earliest period of the sliding window is removed from the cache in the second granularity level. As the method continues adding new data and dropping old data, the point at which there is no more old data in the second granularity level to be dropped, the cache is refreshed with a new set of data by obtaining the new set of data from the storage unit.

In an embodiment, the granularity levels may be chosen such that the cache is refreshed with new data from the storage unit at a pre-defined configurable time of the day, for example, when the load on the system is below a particular threshold.

Some embodiments of the invention have other aspects, elements, features, and steps in addition to or in place of what is described above. These potential additions and replacements are described throughout the rest of the specification.

DETAILED DESCRIPTION

Figure 1:
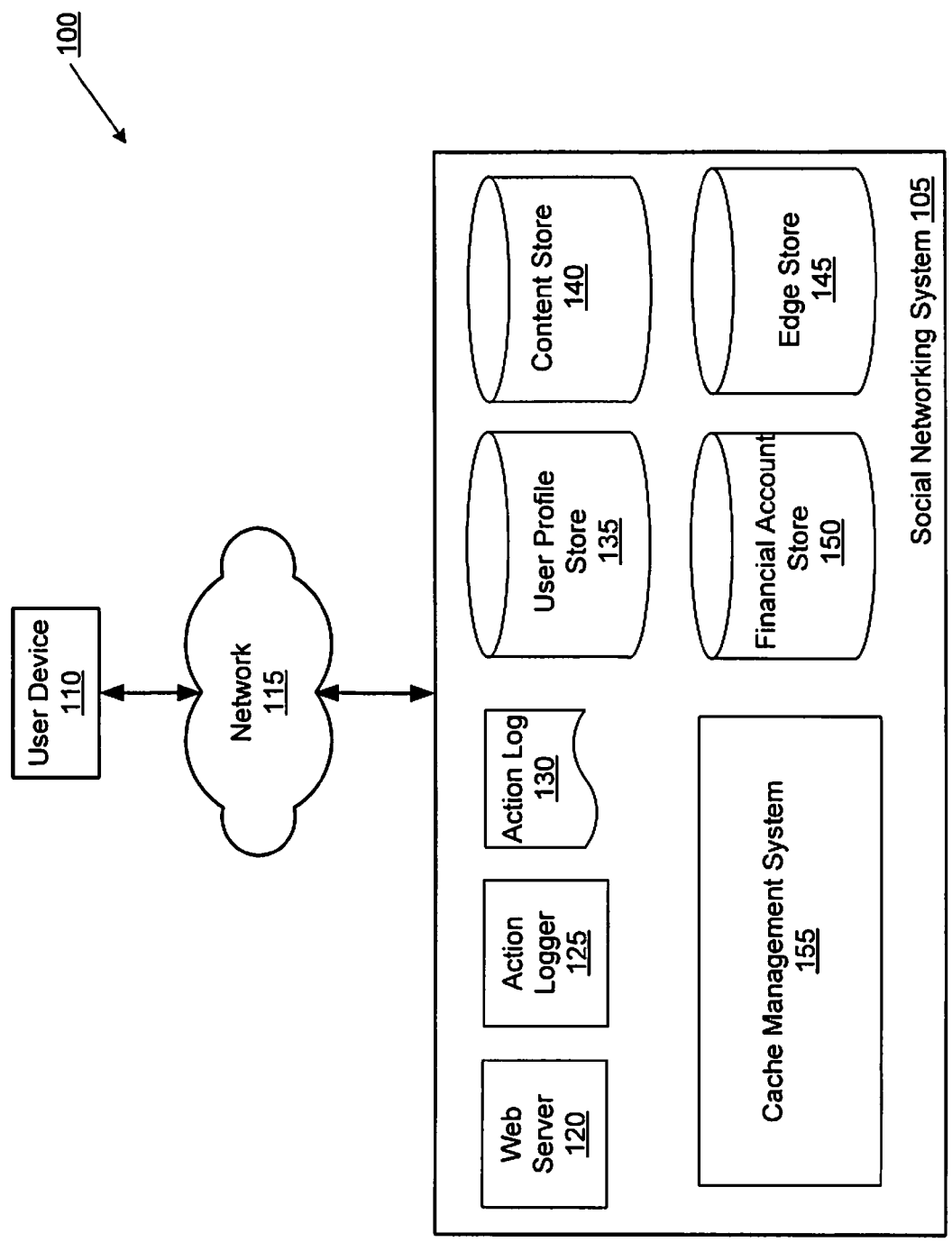
FIG. 1 is an environment in which an embodiment of the invention may operate.

References in this description to "an embodiment", "one embodiment", or the like, mean that the particular feature, function, or characteristic being described is included in at least one embodiment of the present invention. Occurrences of such phrases in this specification do not necessarily all refer to the same embodiment, nor are they necessarily mutually exclusive.

Disclosed are methods, systems, paradigms and structures for caching data associated with a sliding window in computer systems. Certain methods include caching data that is associated with a sliding window and that is frequently requested by an application/end user. One possible sliding window can include a time window that progresses with time. The data associated with a time window can include time series data, such as users or number of users who have visited a particular website in the last one week from current date and time. The time series data is cached to serve queries that may request such time series data often. As time progresses, the sliding window changes bringing in new data. The cache is updated with new data as and when the sliding window moves.

The method includes caching data associated with the sliding window at various granularity levels. The method includes storing a first portion of the data at a first granularity level and a second portion of the data at a second granularity level wherein the first granularity level is different from the second granularity level. The data is cached at various granularity levels in order to effectively use the cache considering (i) the amount of data to be stored, that is, a size/period of the sliding window, (ii) a size of the cache, (iii) the granularity level at which the data is often requested by the end users/applications, (iv) cache update criteria such as—(a) a number of times data is obtained from a storage unit to update the cache, (b) the day/date/time, etc. at which the cache is updated with the data from the storage unit, etc. In at least some embodiments of the disclosed technique, the method facilitates storing data at higher granularity level while consuming less memory.

The second portion of the data corresponds to the earliest period of the sliding window. The first portion corresponds to period later than the earliest period and earlier than the current period. The first portion of the data can be aggregated data, that is, data at second granularity level aggregated to first granularity level, for example, to save space in the cache. When the sliding window progresses, new data is added to the cache at the current time period in second granularity level, and in order to compensate for the cache space occupied by the new data, old data associated with the earliest period of the sliding is removed from the cache in the second granularity level. As the method continues adding new data and dropping old data, the point at which there is no more old data in the second granularity level to be dropped, the cache is refreshed with a new set of data by obtaining the new set of data from the storage unit.

In an embodiment, the granularity levels may be chosen such that the cache is refreshed with new data from the storage unit at a pre-defined configurable time of the day, for example, when the load on the system is below a particular threshold.

FIG. 1 is an environment 100 including a social networking system 105 with which some embodiments of the present invention may be utilized, according to an embodiment of the disclosed technique. The system environment 100 includes a user device 110 interacting with a social networking system 105 over a network 115. In other embodiments, the system environment 100 may include different and/or additional components than those shown by FIG. 1.

The social networking system 105 comprises one or more computing devices storing user profiles associated with users and/or other objects as well as connections between users and other users and/or objects. In use, users join the social networking system 105 and then add connections to other users or objects of the social networking system to which they desire to be connected. As further described below, users of the social networking system 105 may be individuals or entities such as businesses, organizations, universities, manufacturers. The social networking system 105 allows its users to interact with each other as well as with other objects maintained by the social networking system 105. In some embodiments, the social networking system 105 allows users to interact with third-party websites and financial account providers.

Based on stored data about users, objects and connections between users and/or objects, the social networking system 105 generates and maintains a "social graph." comprising a plurality of nodes interconnected by a plurality of edges. Each node in the social graph represents an object or user that can act on another node and/or that can be acted on by another node. An edge between two nodes in the social graph represents a particular kind of connection between the two nodes, which may result from an action that was performed by one of the nodes on the other node. For example, when a user identifies an additional user as a friend, an edge in the social graph is generated connecting a node representing the first user and an additional node representing the additional user. The generated edge has a connection type indicating that the users are friends. As various nodes interact with each other, the social networking system 105 modifies edges connecting the various nodes to reflect the interactions.

A user device 110 is a computing device capable of receiving user input as well as transmitting and/or receiving data via the network 115. In one embodiment, the user device 110 is a conventional computer system, such as a desktop or laptop computer. In another embodiment, the user device 110 may be a device having computer functionality, such as a personal digital assistant (PDA), mobile telephone, smart-phone or similar device. The user device 110 is configured to communicate with the social networking system 105, and/or the financial account provider via the network 115. In one embodiment, the user device 110 executes an application allowing a user of the user device 110 to interact with the social networking system 105. For example, the user device 110 executes a browser application to enable interaction between the user device 110 and the social networking system 105 via the network 115. In another embodiment, a user device 110 interacts with the social networking system 105 through an application programming interface (API) that runs on the native operating system of the user device 110, such as IOS® or ANDROID™.

The user device 110 are configured to communicate via the network 115, which may comprise any combination of local area and/or wide area networks, using both wired and wireless communication systems. In one embodiment, the network 115 uses standard communications technologies and/or protocols. Thus, the network 115 may include links using technologies such as Ethernet, 102.11, worldwide interoperability for microwave access (WiMAX), 3G, 4G, CDMA, digital subscriber line (DSL), etc. Similarly, the networking protocols used on the network 115 may include multiprotocol label switching (MPLS), transmission control protocol/Internet protocol (TCP/IP), User Datagram Protocol (UDP), hypertext transport protocol (HTTP), simple mail transfer protocol (SMTP) and file transfer protocol (FTP). Data exchanged over the network 115 may be represented using technologies and/or formats including hypertext markup language (HTML) or extensible markup language (XML). In addition, all or some of links can be encrypted using conventional encryption technologies such as secure sockets layer (SSL), transport layer security (TLS), and Internet Protocol security (IPsec).

The social networking system 105 includes a web server 120, an action logger 125, an action log 130, a user profile store 135, a content store 140, an edge store 145, a financial account store 150, and a cache management system 155. In other embodiments, the social networking system 105 may include additional, fewer, or different modules for various applications. Conventional components such as network interfaces, security mechanisms, load balancers, failover servers, management and network operations consoles, and the like are not shown so as to not obscure the details of the system architecture.

Web server 120 links social networking system 105 via network 115 to one or more user devices 110; the web server 120 serves web pages, as well as other web-related content, such as Java, Flash, XML, and so forth.

Each user of the social networking system 105 is associated with a user profile, which is stored in the user profile store 135. A user profile includes declarative information about the user that was explicitly shared by the user, and may also include profile information inferred by the social networking system 105. In one embodiment, a user profile includes multiple data fields, each data field describing one or more attributes of the corresponding user of the social networking system 105. The user profile information stored in user profile store 135 describes the users of the social networking system 105, including biographic, demographic, and other types of descriptive information, such as work experience, educational history, gender, hobbies or preferences, location and the like. A user profile may also store other information provided by the user, for example, images or videos. In certain embodiments, images of users may be tagged with identification information of users of the social networking system 105 displayed in an image. A user profile in the user profile store 135 may also maintain references to actions by the corresponding user performed on content items in the content store 140 and stored in the edge store 145.

A user profile may be associated with one or more financial accounts, allowing the user profile to include data retrieved from or derived from a financial account. A user may specify one or more privacy settings, which are stored in the user profile, that limit information from a financial account that the social networking system 105 is permitted to access. For example, a privacy setting limits the social networking system 105 to accessing the transaction history of the financial account and not the current account balance. As another example, a privacy setting limits the social networking system 105 to a subset of the transaction history of the financial account, allowing the social networking system 105 to access transactions within a specified time range, transactions involving less than a threshold transaction amounts, transactions associated with specified vendor identifiers, transactions associated with vendor identifiers other than specified vendor identifiers or any suitable criteria limiting information from a financial account identified by a user that is accessible by the social networking system 105. In one embodiment, information from the financial account is stored in the user profile store 135. In other embodiments, it may be stored in the financial account store 150.

The content store 140 stores content items associated with a user profile, such as images, videos or audio files. Content items from the content store 140 may be displayed when a user profile is viewed or when other content associated with the user profile is viewed. For example, displayed content items may show images or video associated with a user profile or show text describing a user's status. Additionally, other content items may facilitate user engagement by encouraging a user to expand his connections to other users, to invite new users to the system or to increase interaction with the social network system by displaying content related to users, objects, activities, or functionalities of the social networking system 105. Examples of social networking content items include suggested connections or suggestions to perform other actions, media provided to, or maintained by, the social networking system 105 (e.g., pictures or videos), status messages or links posted by users to the social networking system, events, groups, pages (e.g., representing an organization or commercial entity), and any other content provided by, or accessible via, the social networking system.

The content store 140 also includes one or more pages associated with entities having user profiles in the user profile store 135. An entity is a non-individual user of the social networking system 105, such as a business, a vendor, an organization or a university. A page includes content associated with an entity and instructions for presenting the content to a social networking system user. For example, a page identifies content associated with the entity's user profile as well as information describing how to present the content to users viewing the brand page. Vendors may be associated with pages in the content store 140, allowing social networking system users to more easily interact with the vendor via the social networking system 105. A vendor identifier is associated with a vendor's page, allowing the social networking system 105 to identify the vendor and/or to retrieve additional information about the vendor from the user profile store 135, the action log 130 or from any other suitable source using the vendor identifier. In some embodiments, the content store 140 may also store one or more targeting criteria associated with stored objects and identifying one or more characteristics of a user to which the object is eligible to be presented.

The action logger 125 receives communications about user actions on and/or off the social networking system 105, populating the action log 130 with information about user actions. Such actions may include, for example, adding a connection to another user, sending a message to another user, uploading an image, reading a message from another user, viewing content associated with another user, attending an event posted by another user, among others. In some embodiments, the action logger 125 receives, subject to one or more privacy settings, transaction information from a financial account associated with a user and identifies user actions from the transaction information. For example, the action logger 125 retrieves vendor identifiers from the financial account's transaction history and identifies an object, such as a page, in the social networking system associated with the vendor identifier. This allows the action logger 125 to identify a user's purchases of products or services that are associated with a page, or another object, in the content store 140. In addition, a number of actions described in connection with other objects are directed at particular users, so these actions are associated with those users as well. These actions are stored in the action log 130.

The action log 130 may be used by the social networking system 105 to track user actions on the social networking system 105, as well as external website that communicate information to the social networking system 105. Users may interact with various objects on the social networking system 105, including commenting on posts, sharing links, and checking-in to physical locations via a mobile device, accessing content items in a sequence or other interactions. Information describing these actions is stored in the action log 130. Additional examples of interactions with objects on the social networking system 105 included in the action log 130 include commenting on a photo album, communications between users, becoming a fan of a musician, adding an event to a calendar, joining a groups, becoming a fan of a brand page, creating an event, authorizing an application, using an application and engaging in a transaction. Additionally, the action log 130 records a user's interactions with advertisements on the social networking system 105 as well as other applications operating on the social networking system 105. In some embodiments, data from the action log 130 is used to infer interests or preferences of the user, augmenting the interests included in the user profile and allowing a more complete understanding of user preferences.

The action log 130 may also store user actions taken on external websites and/or determined from a financial account associated with the user. For example, an e-commerce website that primarily sells sporting equipment at bargain prices may recognize a user of a social networking system 105 through social plug-ins that enable the e-commerce website to identify the user of the social networking system 105. Because users of the social networking system 105 are uniquely identifiable, e-commerce websites, such as this sporting equipment retailer, may use the information about these users as they visit their websites. The action log 130 records data about these users, including webpage viewing histories, advertisements that were engaged, purchases made, and other patterns from shopping and buying. Actions identified by the action logger 125 from the transaction history of a financial account associated with the user allow the action log 130 to record further information about additional types of user actions.

In one embodiment, an edge store 145 stores the information describing connections between users and other objects on the social networking system 105 in edge objects. Some edges may be defined by users, allowing users to specify their relationships with other users. For example, users may generate edges with other users that parallel the users' real-life relationships, such as friends, co-workers, partners, and so forth. Other edges are generated when users interact with objects in the social networking system 105, such as expressing interest in a page on the social networking system, sharing a link with other users of the social networking system, and commenting on posts made by other users of the social networking system. The edge store 145 stores edge objects that include information about the edge, such as affinity scores for objects, interests, and other users. Affinity scores may be computed by the social networking system 105 over time to approximate a user's affinity for an object, interest, and other users in the social networking system 105 based on the actions performed by the user. Multiple interactions between a user and a specific object may be stored in one edge object in the edge store 145, in one embodiment. In some embodiments, connections between users may be stored in the user profile store 135, or the user profile store 135 may access the edge store 145 to determine connections between users.

The cache management system 155 manages a cache (not shown) of the social networking system 105. The cache management system 155 caches the above discussed data associated with a sliding window and that is frequently requested, for example, by the user device 110.

Figure 2:
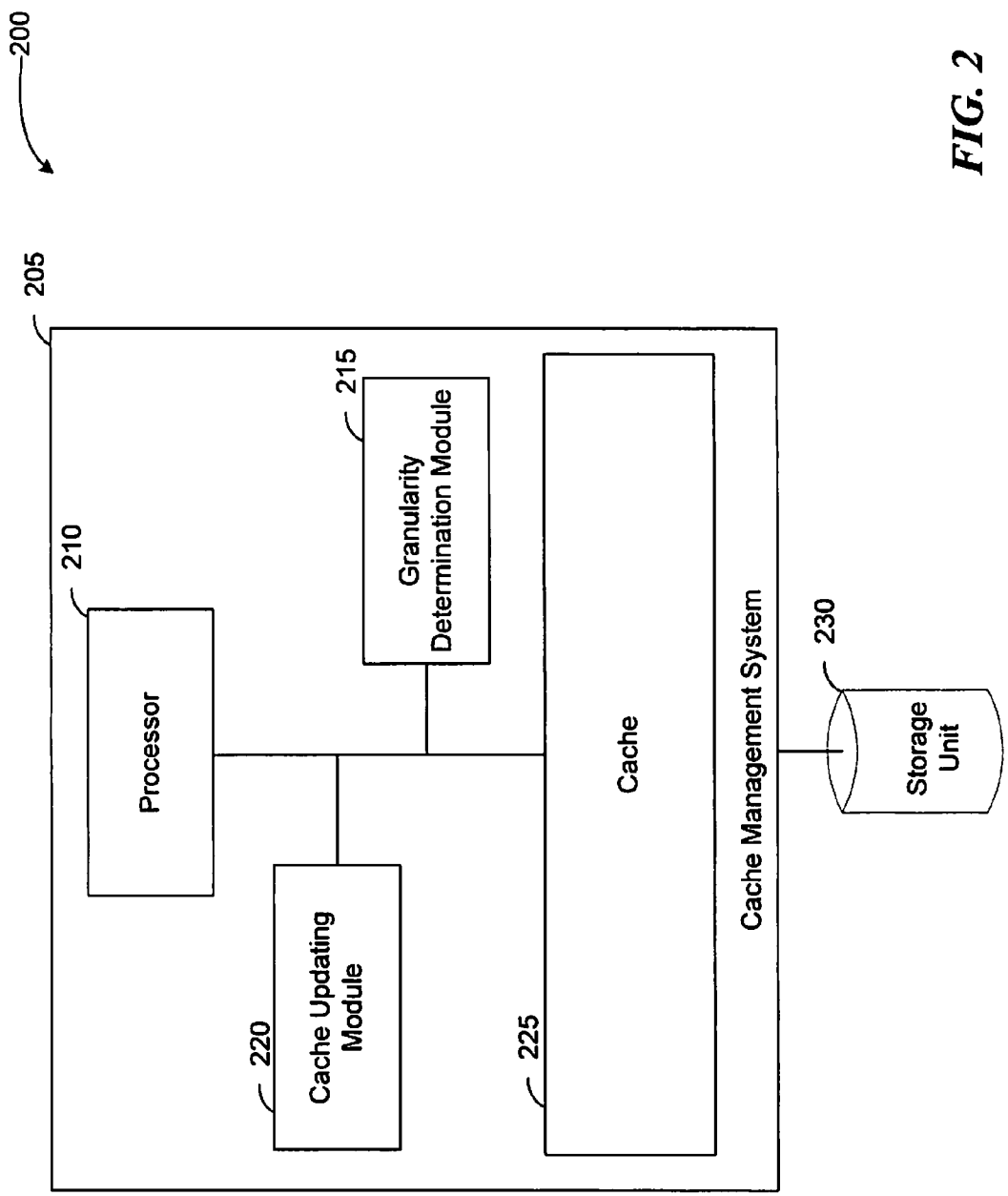
FIG. 2 is a block diagram illustrating a cache management system.

FIG. 2 is a block diagram illustrating a system 200 including a cache management system 205, according to an embodiment of the disclosed technique. In an embodiment, the cache management system 205 can be similar to the cache management system 155 of FIG. 1.

As described above with reference to FIG. 1, the cache management system 205 can be used to store data associated with a sliding window. In an embodiment, the sliding window can include a time window and the data can include time series data. Time series data can include information such as number of applications downloaded by a user in the last one hour, number of applications downloaded in a country, number of users who have visited a web page on an hourly basis for the last one week, etc. The user may generate reports having such data frequently. For example, an advertiser hosting a web page in the social networking system 105 may want to know the number of users, age and gender of the users who visited their web page in the last forty eight hours. Such report may be generated on a daily basis as the sliding window changes. Further, the report may be generated per country, per city, etc. Accordingly, in order to minimize the delay in generating such reports, the cache management system 205 can store that data in the cache 225, and respond to the queries by retrieving the data from the cache 225. The cache 225 may be updated by obtaining the data from a storage unit 230 such as a database. The processor 210 aids in the execution of the instructions to manage the cache 225.

The cache management system 205 caches data considering (i) the amount of data to be stored, that is, a size/period of the sliding window, (ii) a size of the cache, (iii) amount of space utilized in the cache at any given time, (iv) the granularity level at which the data is often requested by the end users/applications, (iv) cache update criteria such as—(a) a number of times data is obtained from a storage unit to update the cache, (b) the day/date/time, etc. at which the cache is updated with the data from the storage unit 230, etc., to achieve better performance and utilization of the cache. Further, in at least some embodiments of the disclosed technique, the cache is designed to store data at higher granularity level while consuming less memory.

Consider, for example, time series data such as number of users who visited a particular website over the last one week from current day and time. The cache management system 205 may store the time series data for the seven day sliding window in the cache 225 at various granularity levels such as minutely, hourly, daily, weekly, monthly, yearly, etc. In an embodiment, the granularity level determination module 215 determines the granularity levels based at least in part on amount of space available in the cache, amount of data associated with sliding window, the granularity level at which the data is requested often by the users, and cache update criteria such as—(a) a number of times data is obtained from a storage unit to update the cache, (b) the day/date/time, etc. at which the cache is updated with the data from the storage unit 230. The cache updating module 220 allocates a plurality of buffers in the cache 225 to store the data. While the size of the buffers storing data at various granularity levels can be the same, in at least some embodiments, the size of each of the buffers can correspond to the granularity level of the data which the buffer stores.

Consider, for example, a scenario where the data for a seven day sliding window is cached at daily granularity level. Consider that a buffer is allocated in the cache 225 to store the data at daily level granularity. At the start of the day in the sliding window, the buffer is empty since no there is no data for the day yet. The buffer will store data only after the day ends. That is, the buffer is empty until the end of the day. The buffer and therefore, the cache 225, is under-utilized for most of the day. In one embodiment, to minimize the under-utilization, data corresponding to higher granularity level, for example, hourly granularity level, is added to the cache 225 as the hour passes by.

Further, the cache management system 205 can store different portions of the sliding window at different granularity levels. In one example, data corresponding to a first day of the seven day period from the current day can be stored at first granularity level such as hourly granularity level and data corresponding to the last six days from current day can be stored at second granularity level such as daily granularity level. Further, the last six days data can be aggregated data, that is, data aggregated from hourly to daily or a single six day data. Aggregation may be performed to, for example, save space in the cache 225. In an embodiment, the granularity level determination module 215 selects the granularity levels for different portions such that (i) the cache 225 is refreshed with new data from the storage unit 230 at a configurable (or pre-defined) time of the day, for example, when the load on the social networking system 105 is below a particular threshold; and (ii) the number of accesses to storage unit 230 is minimized.

When the sliding window progresses, a new buffer having a size corresponding to the second granularity level is allocated for caching new data corresponding to the current time period, and the new data is added to the new buffer in the cache 225 at the current time period of the sliding window in second granularity level. However, since a size of the cache 225 is fixed, to compensate for the addition of the new buffer, an existing buffer of the same size as the new buffer has to be emptied. This means that old data associated with the oldest period of the sliding window which has to be dropped from the cache 225 should also be stored in the second granularity level. Accordingly, in addition to new data, part of the old data is also cached at second granularity level. As the method continues adding new data and dropping old data, the point at which there is no more old data at the second granularity level to be dropped, the cache updating module 220 obtains a new set of data, for a period of last seven days starting from current time, from the storage unit 230 and updates the cache 225 with new set of data by storing different portions of the data at the above selected granularity levels.

Figure 3A:
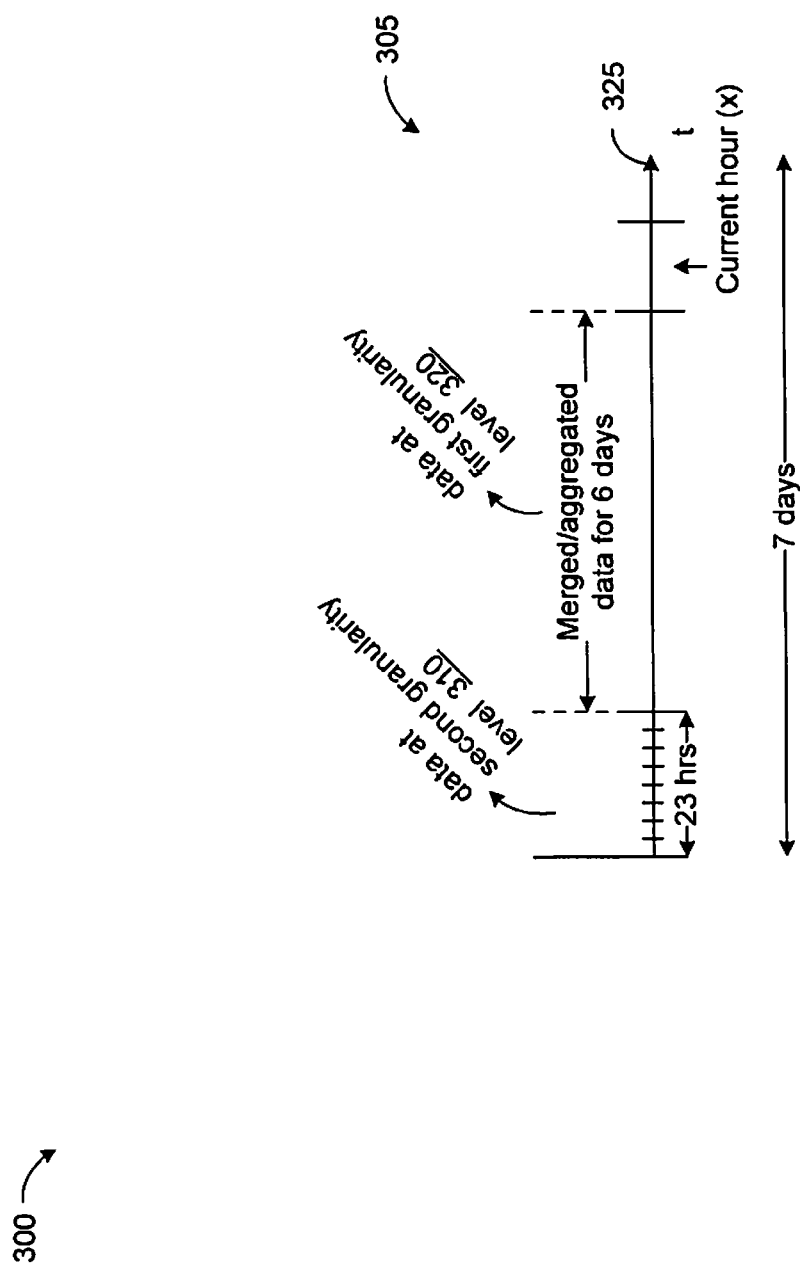
FIGS. 3A-3C are examples illustrating caching data for a seven day sliding window.
Figure 3B:
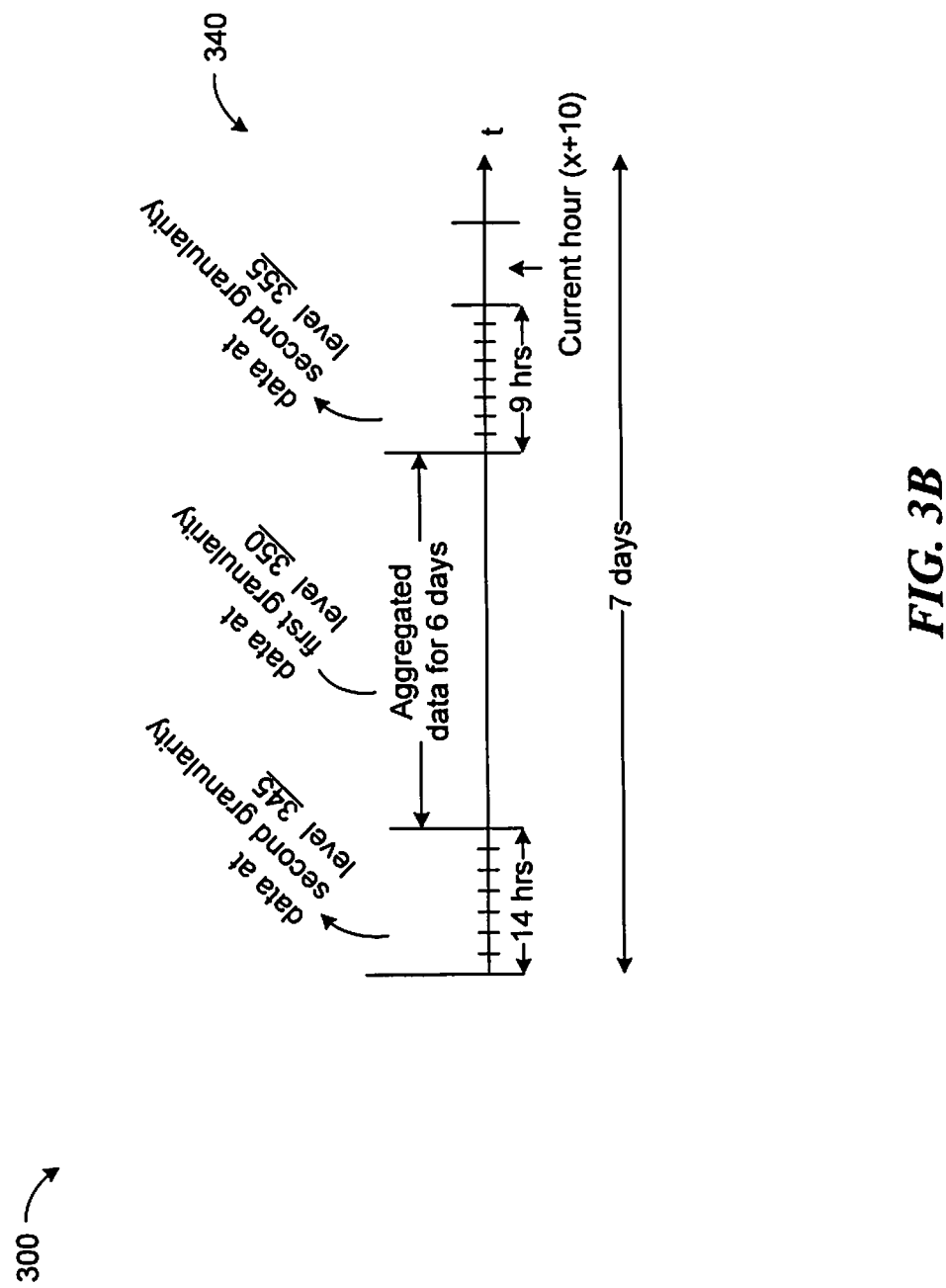
Figure 3C:
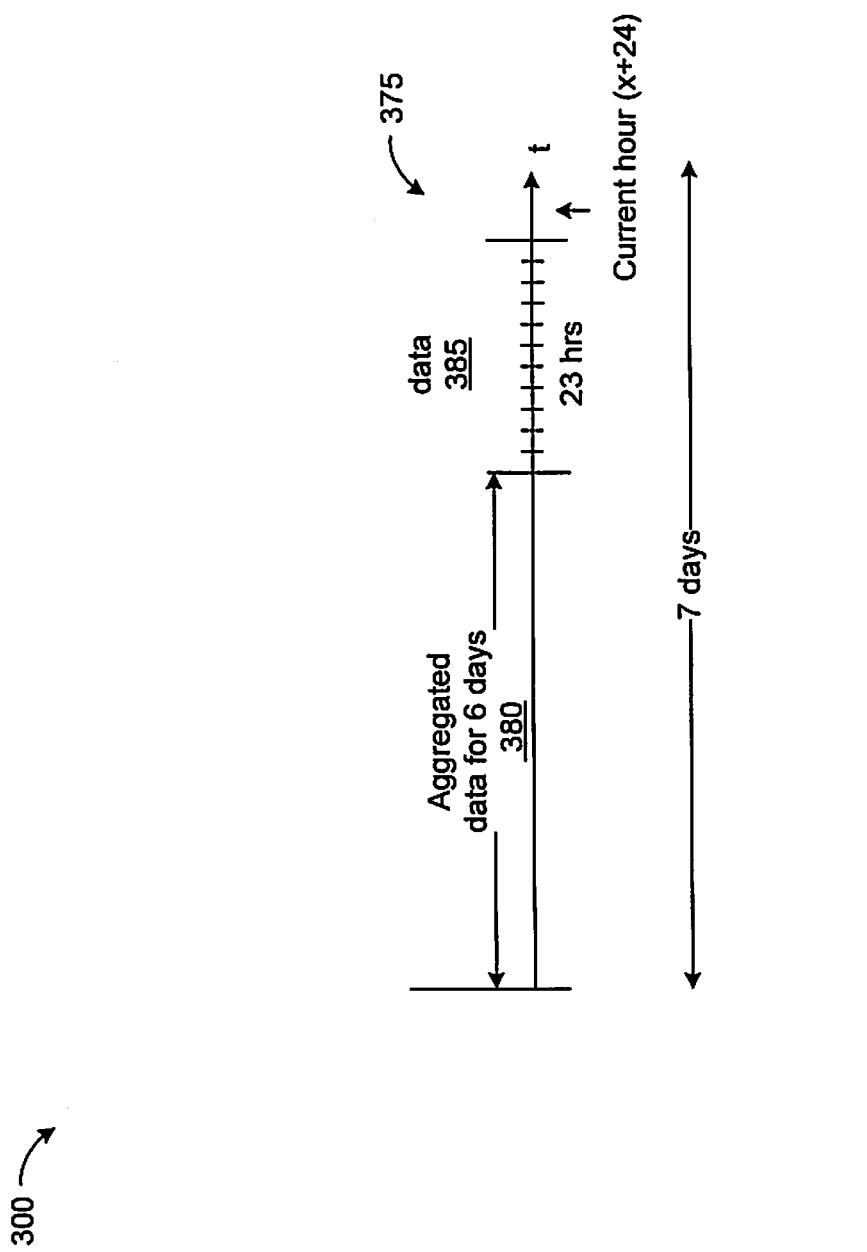

FIG. 3, which includes FIGS. 3A, 3B and 3C, is an example 300 illustrating caching data for a seven day sliding window, according to an embodiment of the disclosed technique. At least some of the objectives of the sliding window 305 include minimizing the storage unit access by accessing the storage unit only when the higher granularity period crosses the sliding window boundary and storing higher granular data (of a certain predefined period) while consuming less memory.

The example may be implemented in system such as system 200 of FIG. 2. Consider for example, the sliding window 305 of FIG. 3A includes time series data such as the users who have visited a particular website over the last seven days from current date and time. The axis 325 represents the time axis for the last seven days. The data may be stored in various granularity levels such as minutely, hourly, daily, weekly, etc. in the cache 225. Typically, for a given time period, the amount of memory consumed to store data at higher granularity level (for example, hourly) is more than the memory consumed for storing data at lower granularity (for example, daily).

In the sliding window 305, a portion of the data 320 is stored at six days granularity level wherein data corresponding to each of the six days is stored in a separate buffer. Another portion of data 310, that is, data corresponding to the earliest twenty three hours of the seven day period is stored at hour granularity level. The data corresponding to each of the twenty three hours is stored in twenty three buffers.

In an embodiment, the six day data 320 is a single computed value obtained by aggregating data for six days. For example, consider a scenario where the user is requesting a list of unique users who visited the site over the seven day period. Consider that users Alan, Bob visited on day one; Bob, Charlie on day two; Alan, Charlie on day three; Bob, Dylan on day 4; Alan, Charlie, Eli on day 5; and Frankenstein on day 6. The data 320 for the six day period may be aggregated into one single value such as "Alan, Bob, Charlie, Dylan, Eli and Frankenstein." In an embodiment, data is aggregated to save space in the cache 225. In an embodiment, the data 320 may be aggregated into one or more values. If the user queries often request data on a weekly basis, storing data in more number of aggregated values may not provide any additional benefits. However, if the queries request data, for example, on a two day basis, the six day data may be aggregated to three two-day-values. The above example aggregates data 320 based on unique users. However, various other aggregation logic may be used to aggregate the data.

As time progresses, the sliding window moves and new data corresponding to the current time period is available. For example, new data can be available as the time progresses by an hour. So, as the time progresses by an hour, a new buffer is allocated at the current time period of the sliding window for caching data corresponding to the hour. For example, sliding window 340 of FIG. 3B represents data in the cache 225 nine hours after the latest time of sliding window 305. A buffer is added to the sliding window 305 every hour for nine hours to store the data of the corresponding hour. The data 355 in the sliding window 340 corresponds to those nine hours.

Further, since a size of the cache 225 is fixed, to compensate for the addition of the new data, old data associated with the earliest period of the sliding window is dropped from the cache 225. That is, a buffer having the oldest data in the hourly granularity level is emptied. The buffer having oldest data is emptied as and when a buffer for storing new data is added. For example, in the sliding window 340, for every new buffer added until the nine hours to store data 355, a buffer having earliest data 310 of sliding window 305 is emptied. The buffer having the earliest data is emptied as and when a new buffer is added to store the data of the past hour. In an embodiment, the earliest data 345 is stored in the same granularity level as the new data 355.

In an embodiment, if the earliest data 310 in the sliding window 305 is stored in a lower granularity level (for example, daily basis) than the new data 355, the cache updating module 220 may have to split the data 310 into higher granularity (for example, hourly) to free a buffer of the same size of the newly added data. To split the data 310, the cache updating module 220 may have to obtain the data 310 at the higher granularity level from the storage unit 230 since the cache 225 has no knowledge of what part of the data 310 belongs to which hour. Obtaining the data from the storage unit 230 consumes significant computing resources which therefore, decreases the efficiency of the cache 225. On the other hand, if the earliest data 310 is stored in a higher granularity level (for example, at half hourly) than the new data 355 or the same granularity level as the new data 355, then one or two buffers may can be emptied from the earliest period to allocate one new buffer to hold the new data at hourly granularity level. This way, the access to the storage unit 230 is minimized.

Referring back to the sliding window 340 of FIG. 3B, as the time progresses, new data is added to the sliding window 340 at the current period, and the earliest data 345 is dropped from the sliding window 340. The sliding window 375 of FIG. 3C represents the data in cache 225 fourteen hours after the latest time in sliding window 340. The sliding window 375 includes (a) data 385 corresponding to the twenty three hours after the latest time in sliding window 305 and (b) aggregated six day data as the earliest data 380 of the sliding window 375. The aggregated six day data 380 is the same as aggregated six day data 350 of FIG. 3B and 320 of FIG. 3A.

In the sliding window 375, as the time progresses further, for example, by another hour, a new buffer corresponding to the hourly granularity level may be allocated to store the new data. However, there is no buffer of size corresponding to the hourly granularity level in the earliest data 380. In order to obtain the buffer of size corresponding to the hourly granularity level, the cache updating module 220 may have to split the buffer having the aggregated six day data 380 into higher granularity level, for example, hourly basis. Since the cache management system 205 does not have the knowledge of the what part of aggregated data 380 belongs to which hour, the cache updating module 220 obtains the new set of data for the last seven days, starting from the current time and date in sliding window 375, from the storage unit 230. In an embodiment, the cache updating module 220 obtains only the portion of the new set of data that is not already stored in the cache 225 at the hourly granularity level. For example, in sliding window 375, the cache updating module 220 may only fetch the data 380, which is not in hourly granularity level, from the storage unit 230. The cache updating module 220 then prepares different portions of the new set of data at different granularity levels as shown in sliding window 305. That is, the earliest twenty three hours of the new set of data is stored at hourly granularity and the later six day data may be aggregated into one or more values.

By selecting appropriate granularity levels, the number of times the storage unit 230 is queried to obtain data to update the cache 225 is controlled and minimized. In the above example 300, the cache 225 is updated with data from the storage unit 230 only once in twenty four hours. Further, since the cache 225 is updated once every 24 hours, the cache management system 205 may be configured to update the cache 225 at a particular time of the day, for example, when the load on the social networking system 105 is lesser than a specific threshold. In other embodiments, other granularity levels may be selected based on other cache updating criteria. For example, if updating the cache 225 is permitted every hour, then data in the earliest period may be stored in a granularity level lower than granularity level at which the new data is added. Storing the data at lower granularity level may save some space in the cache, but the cache may have to be refreshed often.

In the example 300, sliding window is a time window having a size of seven days. However, in other embodiments, the sliding window may be of different periods. Further, the sliding window could be any window based on a different axis other than time. In the example 300, a portion of the time series data is added at hourly, dropped at hourly and another portion is aggregated to a single value at six-day granularity. However, in other embodiments, the data may be added at different granularity levels, dropped at different granularity levels, aggregated at different granularity levels based on (i) the amount of data to be stored, that is, a size/period of the sliding window, (ii) a size of the cache, (iii) amount of space utilized in the cache at any given time, (iv) the granularity level at which the data is often requested by the end users/applications, (iv) cache update criteria such as—(a) a number of times data is obtained from a storage unit to update the cache, (b) the day/date/time, etc. at which the cache is updated with the data from the storage unit 230.

Figure 4:
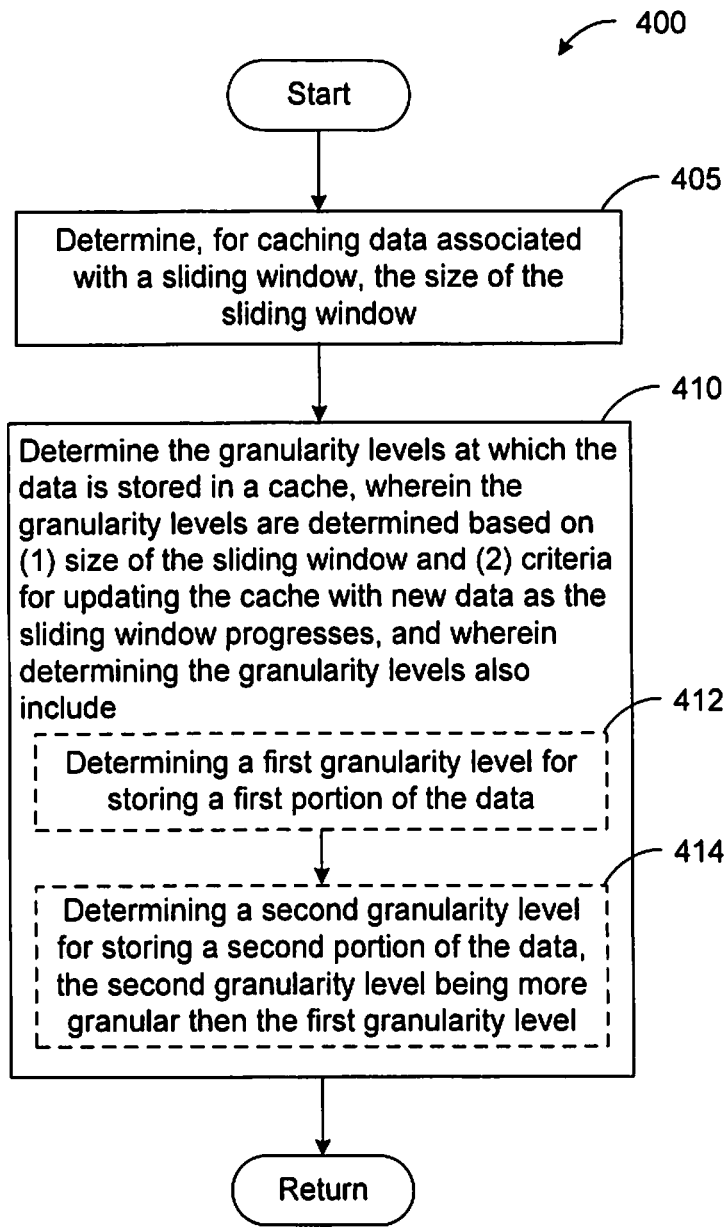
FIG. 4 is a flow diagram illustrating a process of caching data associated with a sliding window.

FIG. 4 is a flow diagram illustrating a process 400 of caching data associated with a sliding window, according to an embodiment of the disclosed technique. The process 400 may be executed in a system such as system 200 of FIG. 2. At step 405, the cache updating module 220 determines a size of the sliding window. In an embodiment, the sliding window can include a time window. The size of the sliding window includes a period of the time window for which data is cached, for example, twenty four hours, seven days.

At step 410, the granularity determination module 215 determines the granularity levels at which the data associated with the sliding window is stored in cache. In an embodiment, the granularity levels include minutely, hourly, daily, etc. The granularity determination module 215 determines a first granularity level for storing a first portion of the data as indicated by step 412. The granularity determination module 215 determines a second granularity level for storing a second portion of the data as indicated by step 414. The second granularity level is more granular (finer) than the first granularity level. The first portion corresponds to a first period of the sliding window and the second portion corresponds to a second period of the sliding window. The second period is the earliest period in the sliding in window.

In an embodiment, different portions of data is stored at different granularity levels in order to minimize updating the cache 225 by querying the storage unit 230 to obtain new data as the sliding window progresses with time. Further, the granularity levels are also determined based at least in part on (i) the amount of data to be stored, that is, a size/period of the sliding window, (ii) a size of the cache, (iii) amount of space utilized in the cache at any given time, (iv) the granularity level at which the data is often requested by the end users/applications, (iv) cache update criteria such as—(a) a number of times data is obtained from a storage unit to update the cache, (b) the day/date/time, etc. at which the cache is updated with the data from the storage unit 230.

Figure 5:
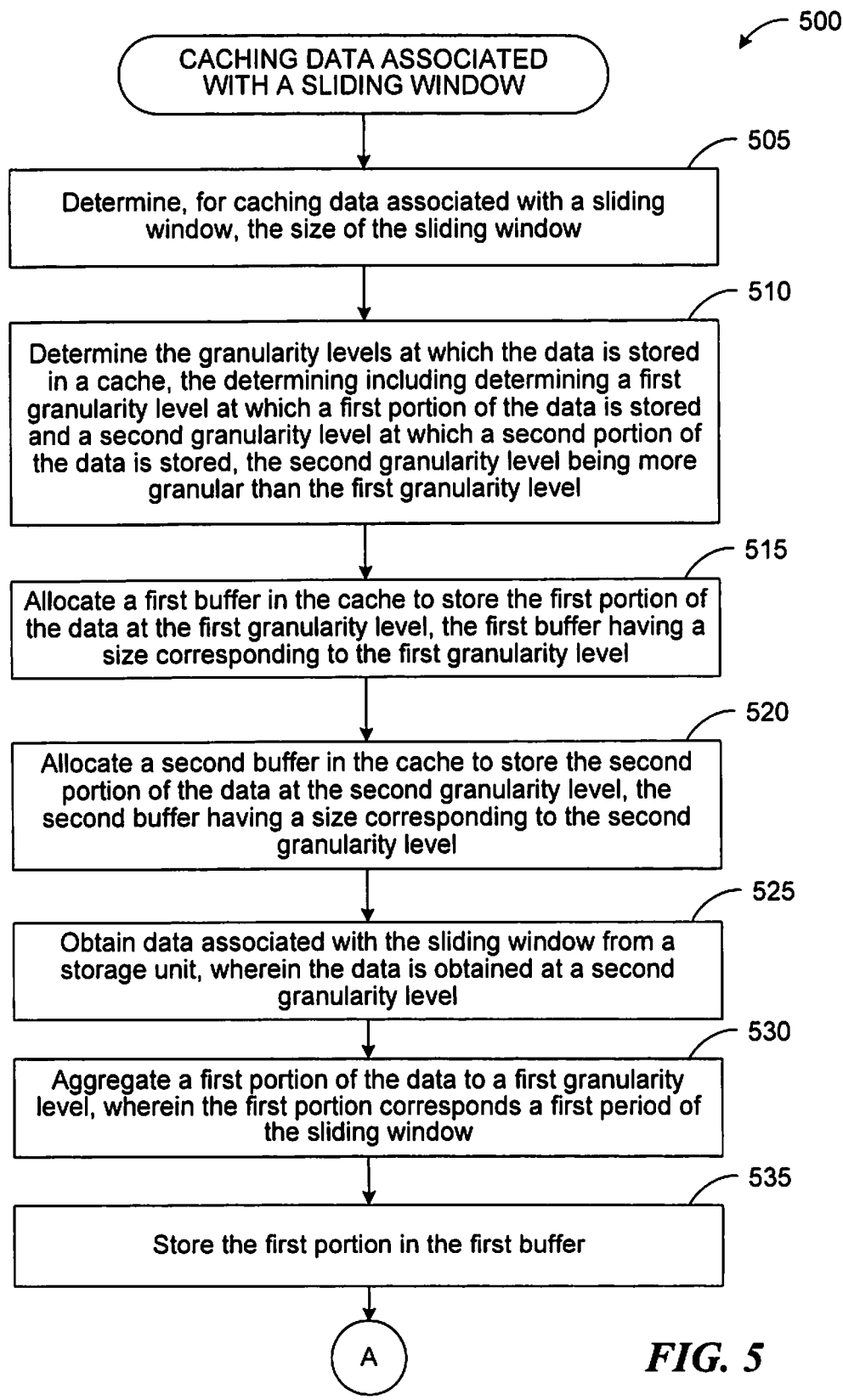
FIG. 5 is another flow diagram illustrating a process of caching data associated with a sliding window.

FIG. 5 is a flow diagram illustrating a process 500 for caching data associated with a sliding window, according to an embodiment of the disclosed technique. The process 500 may be executed in a system such as system 200 of FIG. 2. At step 505, the cache updating module 220 determines a size of the sliding window. In an embodiment, the sliding window can include a time window. The size of the sliding window includes a period of the time window, for example, twenty four hours, seven days, etc. for which data is cached.

At step 510, the granularity determination module 215 determines the granularity levels at which the data associated with the sliding window is stored in cache. In an embodiment, the granularity levels include minutely, hourly, daily, etc. The granularity determination module 215 determines a first granularity level for storing a first portion of the data. The granularity determination module 215 determines a second granularity level for storing a second portion of the data. The second granularity level is more granular (finer) than the first granularity level. The first portion of the data corresponds to a first period of the sliding window and the second portion of the data corresponds to a second period of the sliding window which is the earliest period of the sliding window. In an embodiment, different portions of data is stored at different granularity levels in order to minimize a number of times the cache 225 is updated as the sliding window progresses with time. Every update of the cache 225 involves querying the storage unit 230 to obtain the data which is a resource consuming process.

Further, the granularity levels are also determined based at least in part on (i) the amount of data to be stored, that is, a size/period of the sliding window, (ii) a size of the cache, (iii) amount of space utilized in the cache at any given time, (iv) the granularity level at which the data is often requested by the end users/applications, (iv) cache update criteria such as—(a) a number of times data is obtained from a storage unit to update the cache, (b) the day/date/time, etc. at which the cache is updated with the data from the storage unit 230.

At step 515, the cache updating module 220 allocates a first buffer in the cache 225 to store the first portion of the data at the first granularity level. The first buffer has a buffer size corresponding to the first granularity level. That is, the size of the first buffer is a function of the granularity level of the data it stores. At step 520, the cache updating module 220 allocates a second buffer in the cache 225 to store the second portion of the data in second granularity level. The second buffer has a buffer size corresponding to the second granularity level.

At step 525, the cache updating module 220 obtains data associated with the sliding window from the storage unit 230. The cache updating module 220 obtains the data at the second granularity level. At step 530, the cache updating module 530 aggregates a first portion of the data to a first granularity level. In an embodiment, aggregating data from a second granularity level to a first granularity level can include, for example, aggregating data obtained at hourly level to data at daily level as described with reference to FIG. 3.

At step 535, the cache updating module 220 stores the first portion of the data in the first buffer. At step 540, the cache updating module 220 stores the second portion of the data in the second buffer. As time progresses, the sliding window moves and new data becomes available. When the time progresses by a second granularity level, at step 545, the cache updating module 220 adds new data to the sliding window at the second granularity level. Adding the new data includes allocating a new buffer of a buffer size corresponding to the second granularity level, and storing the new data in the new buffer. Since the size of the cache 225 is fixed, the new buffer may obtained by emptying an existing buffer of the same size. At step 550, the cache updating module 220 drops data corresponding to the earliest period of the sliding window. The data is dropped at a second granularity level to free an existing buffer whose size is equal to the new buffer.

In an embodiment, the cache updating module 220 adds the new data to the cache 225 directly which may be obtained from any of the various components in the social networking system 105. The new data is written into the storage unit 230 separately. Writing the new data into the cache 225 directly avoids querying the storage unit 230 which consumes significant computing resources.

At determination step 555, the cache updating module 220 determines whether the time has progressed by second granularity level. Responsive to a determination that the time has not progressed by second granularity level, the process 500 waits until the time has progressed by second granularity level. On the other hand, responsive to a determination that the time has progressed by second granularity level, at step 560, the cache updating module 220 determines whether the sliding window has data corresponding to the earliest period at second granularity level. Responsive to a determination that the sliding window has data corresponding to the earliest period at second granularity level, the control is transferred to step 545 to further continue adding new data and dropping earliest data. On the other hand, responsive to a determination that the sliding window does not have data corresponding to the earliest period at second granularity level, the control is transferred to step process 525 to obtain new data from the storage unit 230.

Figure 6:
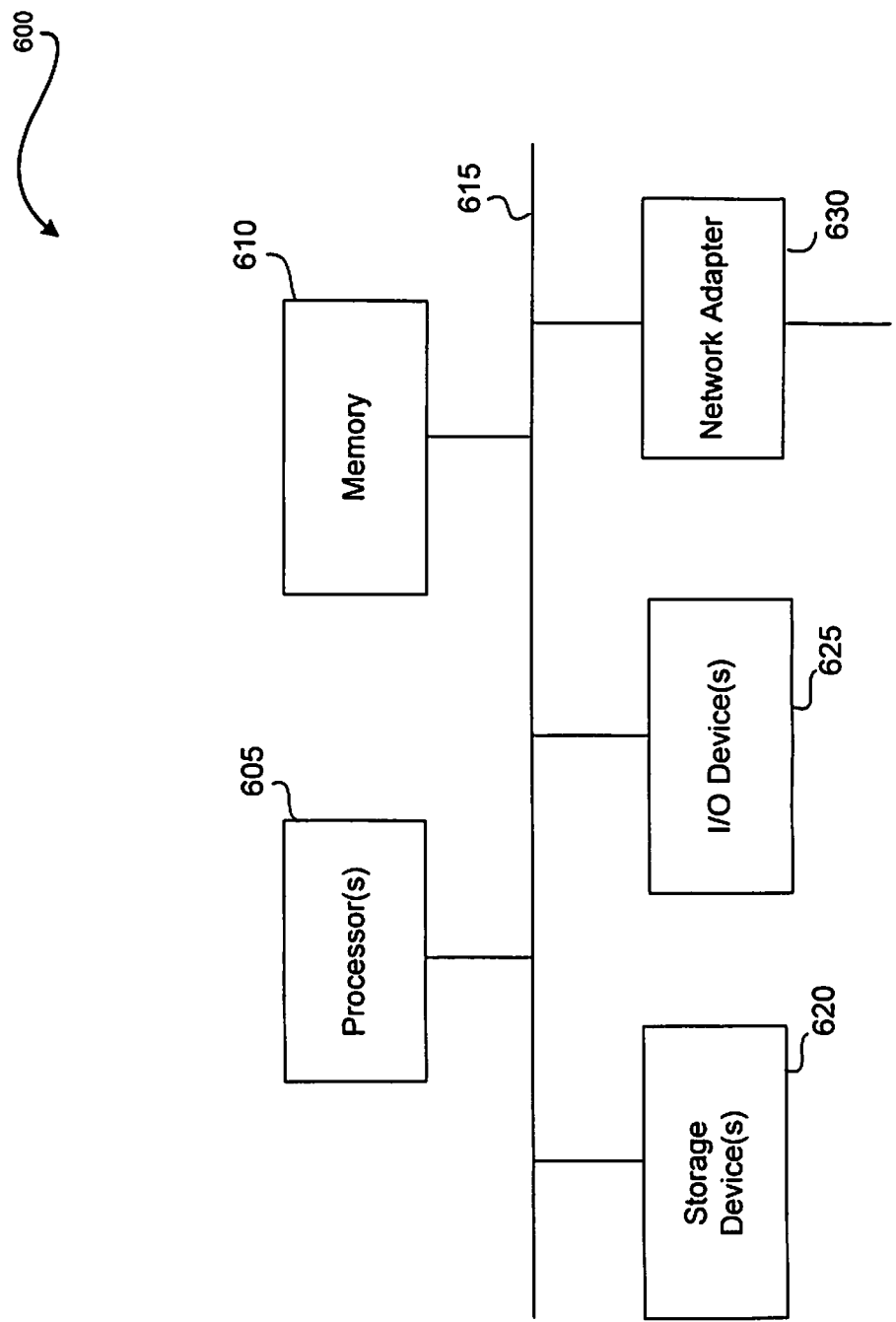
FIG. 6 is a block diagram of a processing system that can implement operations of the present invention.

FIG. 6 is a block diagram of an apparatus that may perform various operations, and store various information generated and/or used by such operations, according to an embodiment of the disclosed technique. The apparatus can represent any computer or processing system described herein. The processing system 600 is a hardware device on which any of the entities, components or services depicted in the examples of FIGS. 1-5 (and any other components described in this specification) can be implemented, such as a cache updating module, granularity level determination module, cache, storage unit etc. The processing system 600 includes one or more processors 605 and memory 610 coupled to an interconnect 615. The interconnect 615 is shown in FIG. 6 as an abstraction that represents any one or more separate physical buses, point to point connections, or both connected by appropriate bridges, adapters, or controllers. The interconnect 615, therefore, may include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire".

The processor(s) 605 is/are the central processing unit (CPU) of the processing system 600 and, thus, control the overall operation of the processing system 600. In certain embodiments, the processor(s) 605 accomplish this by executing software or firmware stored in memory 610. The processor(s) 605 may be, or may include, one or more programmable general-purpose or special-purpose microprocessors, digital signal processors (DSPs), programmable controllers, application specific integrated circuits (ASICs), programmable logic devices (PLDs), trusted platform modules (TPMs), or the like, or a combination of such devices.

The memory 610 is or includes the main memory of the processing system 600. The memory 610 represents any form of random access memory (RAM), read-only memory (ROM), flash memory, or the like, or a combination of such devices. In use, the memory 610 may contain a code. In one embodiment, the code includes a general programming module configured to recognize the general-purpose program received via the computer bus interface, and prepare the general-purpose program for execution at the processor. In another embodiment, the general programming module may be implemented using hardware circuitry such as ASICs, PLDs, or field-programmable gate arrays (FPGAs).

Also connected to the processor(s) 605 through the interconnect 615 are a network adapter 630, a storage device(s) 620 and I/O device(s) 625. The network adapter 630 provides the processing system 600 with the ability to communicate with remote devices, over a network and may be, for example, an Ethernet adapter or Fibre Channel adapter. The network adapter 630 may also provide the processing system 600 with the ability to communicate with other computers within the cluster. In some embodiments, the processing system 600 may use more than one network adapter to deal with the communications within and outside of the cluster separately.

The I/O device(s) 625 can include, for example, a keyboard, a mouse or other pointing device, disk drives, printers, a scanner, and other input and/or output devices, including a display device. The display device can include, for example, a cathode ray tube (CRT), liquid crystal display (LCD), or some other applicable known or convenient display device.

The code stored in memory 610 can be implemented as software and/or firmware to program the processor(s) 605 to carry out actions described above. In certain embodiments, such software or firmware may be initially provided to the processing system 600 by downloading it from a remote system through the processing system 600 (e.g., via network adapter 630).

The techniques introduced herein can be implemented by, for example, programmable circuitry (e.g., one or more microprocessors) programmed with software and/or firmware, or entirely in special-purpose hardwired (non-programmable) circuitry, or in a combination of such forms. Special-purpose hardwired circuitry may be in the form of, for example, one or more ASICs, PLDs, FPGAs, etc.

Software or firmware for use in implementing the techniques introduced here may be stored on a machine-readable storage medium and may be executed by one or more general-purpose or special-purpose programmable microprocessors.

A "machine-readable storage medium", as the term is used herein, includes any mechanism that can store information in a form accessible by a machine.

A machine can also be a server computer, a client computer, a personal computer (PC), a tablet PC, a laptop computer, a set-top box (STB), a personal digital assistant (PDA), a cellular telephone, an iPhone, a Blackberry, a processor, a telephone, a web appliance, a network router, switch or bridge, or any machine capable of executing a set of instructions (sequential or otherwise) that specify actions to be taken by that machine.

A machine-accessible storage medium or a storage device(s) 620 includes, for example, recordable/non-recordable media (e.g., ROM; RAM; magnetic disk storage media; optical storage media; flash memory devices; etc.), etc., or any combination thereof. The storage medium typically may be non-transitory or include a non-transitory device. In this context, a non-transitory storage medium may include a device that is tangible, meaning that the device has a concrete physical form, although the device may change its physical state. Thus, for example, non-transitory refers to a device remaining tangible despite this change in state.

The term "logic", as used herein, can include, for example, programmable circuitry programmed with specific software and/or firmware, special-purpose hardwired circuitry, or a combination thereof.

What is claimed is:

1. A method comprising:
   receiving, at a computer system in a computer network, a request for storing data associated with a sliding window in a cache memory of the computer system;
   determining, by the computer system a window size of the sliding window;
   determining granularity levels at which the data associated with the sliding window is to be stored in the cache memory, the determining:
     configuring the cache memory to store a first portion of the data at a first granularity level and a second portion of the data at a second granularity level, the second granularity level being different from the first granularity level, and
     configuring the cache memory to store at least a portion of the first portion of the data at the second granularity level when the second portion of the data is removed from the cache memory, and wherein the granularity levels are determined based on at least one of (a) the window size, or (b) criteria for updating the cache memory with new data as the sliding window progresses; and
   storing different portions of the data at their corresponding granularity levels in the cache memory.

2. The method of claim 1, wherein the sliding window is a time window.

3. The method of claim 2, wherein the data is time series data.

4. The method of claim 2, where in the granularity levels includes at least one of number of (a) minutes, (b) hours, (c) days, (d) months, or (e) years.

5. The method of claim 2 further comprising:
   obtaining, from a storage unit in the computer network, the data associated with the time window at the second granularity level;
   aggregating the first portion of the data to the first granularity level, the first portion of the data corresponding to a first period of the time window;
   storing the first portion of the data in the cache memory at the first granularity level;
   storing the second portion of the data in the cache memory at the second granularity level, the second portion of the data corresponding to a second period of the time window.

6. The method of claim 5, wherein the storing the first portion and the second portion of the data in the cache memory includes
   storing the first portion in a first buffer of the cache memory, the first buffer having a size corresponding to the first granularity level, and
   storing the second portion in a second buffer of the cache memory, the second buffer having a size corresponding to the second granularity level.

7. The method of claim 6 further comprising: adding, as the time window progresses in time by a second granularity level generating a new time window, new data associated with a current time period to the cache memory, the adding including adding the new data at the second granularity level.

8. The method of claim 7, wherein the second period is earliest period of the time window, and wherein the time window includes the first period, the second period and the current period in the order of the second period, the first period and the current period.

9. The method of claim 7 further comprising:
   dropping the data from the second period of the time window when the new data is added to the cache memory, the dropping including dropping the data at the second granularity level.

10. The method of claim 9, wherein adding the new data includes allocating a new buffer in the cache memory to store the new data, the new buffer having a buffer size corresponding to the second granularity level, and wherein allocating the new buffer includes emptying an existing buffer having the data from the second period of the time window, the existing buffer having a buffer size corresponding to the second granularity level.

11. The method of claim 9 further comprising:
    updating the cache memory with new set of data when there is no more data to drop from the second period, the updating including
      obtaining, from the storage unit, the new set of data associated with a new time window, wherein obtaining the new set of data includes obtaining a portion of the new set of data that is not already stored in the cache memory at the second granularity level,
      aggregating the new set of data for the first period to the first granularity level,
      storing the new set of data for the first period in the cache memory, and
      storing the new set of data for the second period in the cache memory at the second granularity level.

12. The method of claim 1, wherein the granularity levels of the data cached are further based on at least one of (a) criteria for usage of the cache, or (a) granularity level of data requested by a user query.

13. A method comprising:
    allocating, in a cache memory and for caching time series data associated with a sliding time window, a first buffer to store the time series data corresponding to a first portion of a period of the sliding time window, the time series data corresponding to the first portion stored at a first granularity level, and the first buffer having a size corresponding to the first granularity level;
    allocating a second buffer in the cache memory to store the time series data corresponding to a second portion of the period of the sliding time window, the time series data corresponding to the second portion stored at a second granularity level, and the second buffer having a size corresponding to the second granularity level, the allocating further including configuring the cache memory to store at least a portion of the time series data corresponding to the first portion at the second granularity level when the time series data corresponding to the second portion is removed from the cache memory; and storing time series data corresponding to different portions of the period at their corresponding granularity levels in the cache memory.

14. The method of claim 13, wherein the first granularity level and second granularity level are further determined based on criteria for updating the cache memory with new time series data as the sliding time window progresses.

15. The method of claim 13 further comprising:
obtaining, from a storage unit in a computer network, the time series data for the first portion at the second granularity level;
aggregating the time series data for the first portion to the first granularity level;
storing the time series data corresponding to the first portion in the first buffer; and
storing the time series data corresponding to the second portion in the second buffer at the second granularity level.

16. The method of claim 15 further comprising:
adding, as the sliding time window progresses in time by the second granularity level generating a new sliding time window, new time series data associated with the new sliding time window to the cache memory, the adding including adding the new time series data at the second granularity level; and
dropping the time series data from earliest period of the sliding time window when the new time series data is added to the cache memory, the dropping including dropping the time series data at the second granularity level.

17. The method of claim 16, wherein adding the new time series data includes allocating a new buffer in the cache memory to store the new time series data, the new buffer having a buffer size corresponding to the second granularity level, and wherein allocating the new buffer includes emptying an existing buffer having the time series data from the earliest period of the time window, the existing buffer having a buffer size corresponding to the second granularity level.

18. An apparatus comprising:
a processor;
a cache memory configured to store data associated with a sliding window, the cache memory configured to store the data at a plurality of granularity levels; and
a granularity determination module that is configured to work in cooperation with the processor to determine the granularity levels at which the data associated with the sliding window is to be stored in the cache memory, the granularity determination module configured to:
determine a first granularity level for storing a first portion of the data,
determining a second granularity level for storing a second portion of the data, the second granularity level being different from the first granularity level, wherein the cache memory is further configured to store at least a portion of the first portion of the data at the second granularity level when the second portion of the data is removed from the cache memory, and wherein the granularity levels are determined based on criteria for refreshing the cache memory with new data as the sliding window moves.

19. The apparatus of claim 18 further comprising:
a storage unit that stores the data.

20. The apparatus of claim 19 further comprising:
a cache updating module that works in cooperation with the granularity determination module to update the cache memory with the data from with storage unit.

* * * * *